US009222576B2

(12) United States Patent
Knoth et al.

(10) Patent No.: US 9,222,576 B2
(45) Date of Patent: Dec. 29, 2015

(54) HYDRAULIC SYSTEM CHARGE DETECTION

(71) Applicant: GM GLOBAL TECHNOLOGY OPERATIONS LLC, Detroit, MI (US)

(72) Inventors: Matthew R. Knoth, Lake Orion, MI (US); Eric S. Tryon, Indianapolis, IN (US); Lawrence A. Kaminsky, White Lake, MI (US); Scott T. Weisgerber, Fishers, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 40 days.

(21) Appl. No.: 14/285,877

(22) Filed: May 23, 2014

(65) Prior Publication Data

US 2015/0337950 A1 Nov. 26, 2015

(51) Int. Cl.
| | |
|---|---|
| F16H 61/4157 | (2010.01) |
| F16H 61/4008 | (2010.01) |
| F16H 61/42 | (2010.01) |
| F16H 61/46 | (2010.01) |
| B60K 17/10 | (2006.01) |
| F16H 61/00 | (2006.01) |
| F16H 61/28 | (2006.01) |
| F16H 59/74 | (2006.01) |

(52) U.S. Cl.
CPC ............ *F16H 61/0031* (2013.01); *F16H 59/74* (2013.01); *F16H 61/2807* (2013.01); *B60K 17/10* (2013.01); *F16H 61/4008* (2013.01); *F16H 61/4157* (2013.01); *F16H 61/42* (2013.01); *F16H 61/46* (2013.01); *F16H 2059/746* (2013.01)

(58) Field of Classification Search
CPC ..... F16H 61/4157; F16H 61/42; F16H 61/46; F16H 61/4008; B60K 17/10
See application file for complete search history.

(56) References Cited

U.S. PATENT DOCUMENTS 6,250,077 B1 * 6/2001 Iino et al. .................... 60/436

* cited by examiner

*Primary Examiner* — Tisha Lewis
(74) *Attorney, Agent, or Firm* — Quinn Law Group, PLLC

(57) ABSTRACT

A vehicle includes a transmission, an electrically-driven fluid pump which supplies pressure to a hydraulically-actuated clutch of the transmission, and pump motor sensors positioned with respect to a pump motor of the fluid pump. The sensors are configured to measure electrical properties of the pump motor, and to output the measured electrical properties as input signals. A controller detects when the hydraulic circuit is fully charged by determining an actual speed of the pump motor. The controller calculates an average pump torque and a slope of the average pump torque for the pump motor using the input signals. A flag is set via the controller indicating that a calibrated line pressure has been attained in the hydraulic circuit when the slope of the average pump torque reaches zero and the speed of the pump motor reaches a calibrated speed.

18 Claims, 2 Drawing Sheets

HYDRAULIC SYSTEM CHARGE DETECTION

TECHNICAL FIELD

The present disclosure relates to charge detection in a hydraulic system.

BACKGROUND

Vehicle transmissions typically include multiple gear sets and clutches. Elements of the gear sets are selectively connected to each other and/or a stationary member of the transmission via engagement of one or more of the clutches. A fluid pump and numerous control fluid valves provide hydraulic pressure to the clutches. The fluid pump in some vehicles, such as certain hybrid electric vehicles, may be powered via electricity rather than by an internal combustion engine so as to maintain sufficient hydraulic pressure when the engine is not running. Charging of a hydraulic system refers to the process of filling the fluid passages supplying hydraulic pressure to the various clutches until a desired calibrated line pressure is attained.

SUMMARY

A vehicle is described herein that includes a transmission and a controller. The transmission is supplied with hydraulic pressure by a hydraulic system having an electrically-driven fluid pump, i.e., a fluid pump with an electrically-driven pump motor. The controller is programmed to detect, without the use of pressure sensors, when the hydraulic system is fully charged, i.e., when actual line pressure has reached a calibrated line pressure, with "calibrated line pressure" as used herein referring to a desired "fully charged" line pressure sufficient for achieving a desired event, such as clutch actuation prior to or concurrent with engine starting.

To determine when the hydraulic system is sufficiently charged, the controller monitors the voltage, current, and rotational speed of the pump motor, and evaluates these measured parameters for certain characteristics indicative of a sufficiently charged hydraulic system. Thereafter, the controller may command a suitable control action requiring the calibrated line pressure, such as a cranking and starting of the engine via actuation of one or more clutches of the vehicle. Using the present approach, engine start and drive-away times may be reduced by minimizing the time spent transitioning from a key-crank position to vehicle propulsion. Such an approach may be optimal relative to conventional methods, such as waiting through a calibrated duration via an open-loop timer and/or using pressure switches/transducers to measure the changing hydraulic pressure.

A vehicle according to an example embodiment includes a transmission, a hydraulic system, pump motor sensors, and a controller. The hydraulic system includes an electrically-driven fluid pump, while the hydraulic system provides hydraulic pressure to the transmission. The pump motor sensors, which are positioned with respect to an electrically-driven pump motor of the fluid pump, measure electrical properties of the pump motor, such as voltage, current, and back-EMF, and possibly a rotational speed in some embodiments, and then collectively output the measured electrical properties as input signals. The controller detects when the hydraulic system is sufficiently charged, i.e., fully-charged for the purposes of executing a predetermined event such as clutch engagement.

To do this, the controller determines an actual speed of the pump motor, either by direct measurement or via calculation, and also determines when the actual speed of the pump motor exceeds a calibrated speed threshold. The controller also calculates an average pump torque and a slope of the average pump torque for the fluid pump using the input signals. The controller also sets a flag in memory indicating that a desired calibrated line pressure has been attained in the hydraulic system. The flag is set when the slope of the average pump torque reaches zero after pump speed reaches the calibrated speed threshold.

In another embodiment, a system includes an electrically-driven fluid pump operable for circulating fluid to a hydraulically-actuated device, a set of pump motor sensors positioned with respect to a pump motor of the fluid pump, and the controller noted above. As with the vehicle embodiment, the pump motor sensors are configured to measure electrical properties of the pump motor and output the measured electrical properties as input signals, and the controller is programmed to execute instructions to determine when a desired calibrated line pressure has been attained.

The above features and advantages and other features and advantages of the present invention are readily apparent from the following detailed description of the best modes for carrying out the invention when taken in connection with the accompanying drawings.

DETAILED DESCRIPTION

Figure 1:
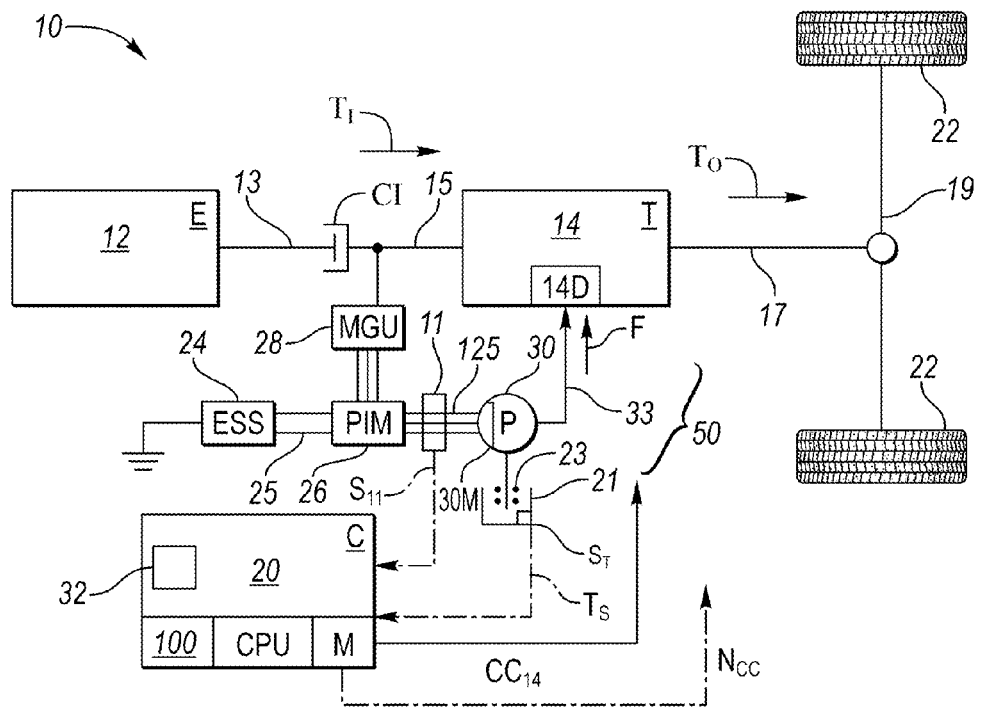
FIG. 1 is a schematic illustration of an example vehicle having a hydraulic system with an electrically-driven pump and a controller programmed to determine when the hydraulic system is charged.

Referring to the drawings wherein like reference numbers correspond to like or similar components throughout the several figures, an example vehicle 10 is shown schematically in FIG. 1. The vehicle 10 includes a transmission (T) 14, a hydraulic system 50 operable to deliver hydraulic pressure (arrow F) to the transmission 14 via a hydraulic circuit 33, and a controller (C) 20 programmed to detect when the hydraulic circuit 33 is sufficiently charged relative to a desired or calibrated line pressure. To do this, the controller 20 is provided process instructions embodying a method 100, an example of which is described below with reference to FIGS. 2 and 3.

The vehicle 10, which may be configured as a hybrid electric vehicle, includes an internal combustion engine (E) 12 and the transmission 14, the latter of which may include a hydraulically-actuated device 14D, an input member 15, and an output member 17. The output member 17 delivers output torque (arrow $T_O$) from the transmission 14 to a drive axle 19 and a set of drive wheels 22. Torque from the drive wheels 22 may also be used at times for regenerative braking. An input clutch CI, such as a friction clutch or a hydrodynamic torque converter, may be disposed between an output shaft 13 of the engine 12 and the input member 15 of the transmission 14 to selectively engage the engine 12 and the transmission 14. When the input clutch CI is applied, input torque (arrow $T_I$) from the engine 12 and/or one or more motor/generator units, e.g., an MGU 28, may be delivered to the transmission 14. While shown separately in FIG. 1 for illustrative clarity, the MGU 28 and/or additional MGUs (not shown) may be included within the transmission 14, with the relative position of such MGUs depending on the design of the vehicle 10.

The vehicle 10 of FIG. 1, when configured as a hybrid electric vehicle, has a variety of possible operating modes. Such operating modes may include at least one electric vehicle (EV) mode in which the engine 12 is turned off. In an EV mode the input torque (arrow $T_I$) is provided solely via the MGU 28 as noted above. The engine 12 may be turned off at other times, such as while the vehicle 10 is idling, so as to conserve idle fuel consumption. Therefore, at times the controller 20 may be required to command a restarting of the engine 12. The method 100 described herein allows the controller 20 to accurately determine precisely when the hydraulic system 50 is sufficiently charged to a desired calibrated line pressure level ensuring that sufficient clutch torque capacity exists for a predetermined event.

Such an event may require engaging the input clutch CI, the hydraulically-actuated device 14D, and/or any other clutches of the transmission 14, e.g., when cranking and starting the engine 12. The method 100 is applicable to any control event in which a desired calibrated line pressure is needed within the vehicle 10, with a requested engine start being just one possible example. That is, the method 100 may be used when starting from any condition in which an electrically-driven fluid pump (P) 30 is initially off or providing less than a required amount of line pressure, although the method 100 could also be adapted to determine when any given pressure is met from any starting point, as will be appreciated by those of ordinary skill in the art.

Electric power aboard the vehicle 10 may include both auxiliary and high-voltage power. For illustrative simplicity, only high-voltage power is shown in FIG. 1, with the term "high-power" referring to voltage levels in excess of typical 12-15 volt auxiliary levels. The vehicle 10 may include an electric storage system (ESS) 24, e.g., a multi-cell rechargeable battery module, which is connected to a power inverter module (PIM) 26 via a DC bus 25. In the embodiment shown, the fluid pump 30 includes a pump motor 30M, e.g., a polyphase motor, that is electrically connected to the PIM 26 via an AC voltage bus 125. The voltage level of the AC voltage bus 125 may be high-voltage, e.g., at least 18 VAC in an example embodiment. The fluid pump 30 draws hydraulic fluid 23 from a sump 21 and delivers the fluid 23 under pressure to the transmission 14 via the hydraulic circuit 33 as indicated by arrow F. As is known in the art, a fluid return line (not shown) returns the fluid 23 to the sump 21 to complete a fluid circuit within the hydraulic system 50.

As part of the present approach, the controller 20 of FIG. 1 receives input signals (arrow $S_{11}$) from a set of pump motor sensors 11 positioned with respect to the pump motor 30M, and may also receive a measured sump temperature (arrow $T_S$) from an optional temperature sensor $S_T$, e.g., a thermistor, that is positioned in or near the sump 21. The pump motor sensors 11 are configured to measure predetermined electrical properties of the pump motor 30M, and to output the measured electrical properties as the input signals (arrow $S_{11}$). In an optional embodiment, the sump temperature (arrow $T_S$) may be estimated by the controller 20 in the event of a failure of the temperature sensor $S_T$, e.g., using a last-measured temperature value that is adjusted via a temperature model (not shown) as is known in the art.

In executing the method 100, the controller 20 of FIG. 1 outputs a transmission control signal (arrow $CC_{14}$) to the transmission 14, and may also output pump speed control signals (arrow $N_{CC}$) to the pump motor 30M to command a desired pump speed via energizing of the pump motor 30M. As explained below, the input signals (arrow $S_{11}$) may include an actual rotational speed of the pump motor 30M, which may be a calculated value using motor control logic as is well understood in the art, e.g., using the measured back-EMF of the pump motor 30M in a "sensorless" design, or directly measured via a speed sensor as one of the sensors 11 in another embodiment. The input signals (arrow $S_{11}$) may also include measured EMF of the pump motor 30M, as well as electrical current and voltage supplied to the pump motor 30M via the AC bus 125. Using the input signals (arrow $S_{11}$), the controller 20 may calculate values as needed, including output torque from the fluid pump 30.

The controller 20 may include a central processing unit (CPU) and sufficient memory M, at least some of which is tangible and non-transitory. Memory M may include sufficient read only memory (ROM), random access memory (RAM), electrically-programmable read-only memory (EPROM), flash memory, etc., and any required circuitry including but not limited to a high-speed clock (not shown), analog-to-digital (A/D) circuitry, digital-to-analog (D/A) circuitry, a digital signal processor (DSP), and the necessary input/output (I/O) devices and other signal conditioning and/or buffer circuitry.

The vehicle 10 shown in FIG. 1 is characterized by an absence of an auxiliary 12-15 VDC starter motor. Therefore, in order to start the engine 12, torque must be applied to the output shaft 13 of the engine 12 from one of the motor/generator units, such as the MGU 28. In advance of such a start, the controller 20 is programmed to control the pump motor 30M, e.g., via the pump speed control signals (arrow $N_{CC}$) or using another approach such as torque control, to thereby charge the hydraulic system 50 to a desired calibrated line pressure. The decision to start the engine 12 may be made at various times, and/or from different sources. For instance, a driver of the vehicle 10 may use a key fob to command a remote start of the engine 12, or a button or key within the vehicle 10 may be depressed to the same effect. Additionally, logic of the controller 20 may determine, based on operating parameters such as a depression of an accelerator pedal (not shown), that the engine 12 should be automatically restarted.

Different fluid temperature conditions may be present at different times. For example, the sump temperature ($T_S$), i.e., the bulk fluid temperature, may be the same as the temperature of fluid lubricating the various gear sets of the transmission 14, or the temperatures may be different. When both are cold, such as after the vehicle 10 has been idle for an extended period of time, increased viscous drag may act on the fluid pump 30, which will affect the torque from the pump motor 30M. At times, the film temperature at the clutches or gear sets of the transmission 14 may exceed that of the bulk fluid temperature, such as at different stages of drain down or when the hydraulic system is emptied after a service operation.

A film temperature having a known impact on the performance of the pump motor 30M is the film temperature present in a gear set (not shown) of the fluid pump 30. The temperature difference between the pump film temperature and the bulk fluid temperature is a typical result of an extended vehicle-off "soak" period at cold temperatures, e.g., in the range of about −40° C. to 10° C. When the pump motor 30M is commanded to rotate, the film temperature warms much more rapidly that the bulk sump temperature, thus impacting motor torque from the pump motor 30M, which in turn can negate the usefulness of using the bulk sump temperature alone for temperature compensation of pump motor torque.

Depending on the temperature variance, torque from the pump motor 30M may vary. The present approach recognizes that these differences may be present, and may adjust any control decisions or processing steps using a temperature model 32, e.g., a lookup table indexed by the measured sump temperature $T_S$. The controller 20 in all embodiments processes the input signals (arrow $S_{11}$) from the pump motor sensors 11 and calculates certain values to determine when the hydraulic system 50 is fully charged, regardless of the temperature difference noted above.

In a particular embodiment, the pump motor 30M may be controlled solely via open-loop speed commands, i.e., the pump speed control signals (arrow $N_{CC}$). Using three-phase "sensorless" control, the torque and speed of the pump motor 30M are not directly measured, but rather are calculated as a function of voltage, current, and back-EMF, all three of which may be measured by the sensors 11 of FIG. 1. Sump temperature ($T_S$) can be used to further refine the results of the method 100, e.g., with different bands of the sump temperature corresponding to different calibration values.

Figure 2:
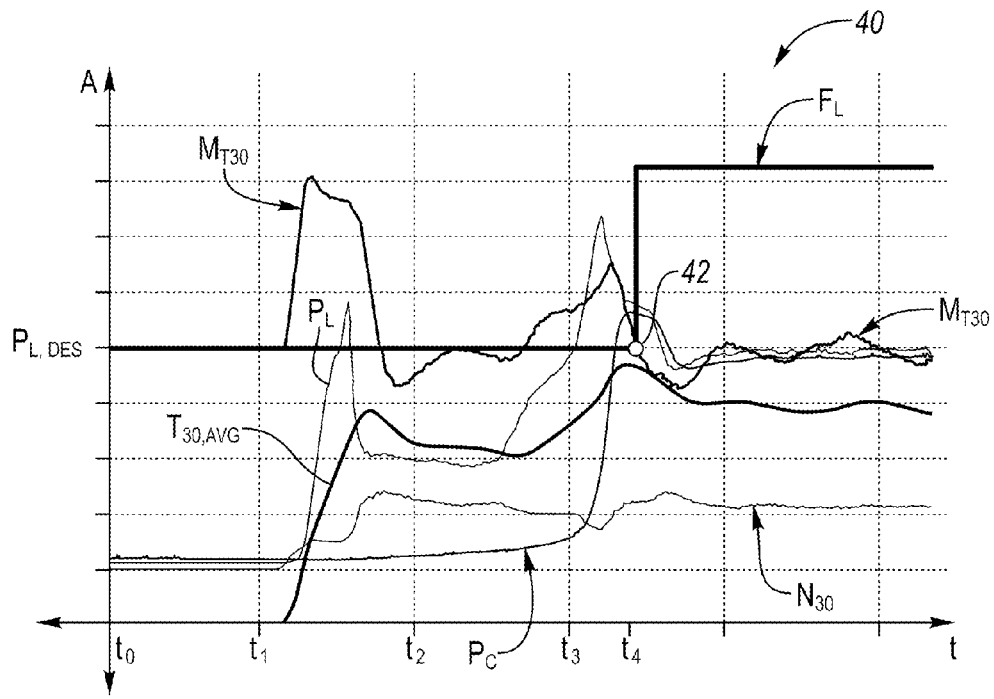
FIG. 2 is a time plot of vehicle performance values for the vehicle of FIG. 1, with time depicted on the horizontal axis and amplitude depicted on the vertical axis.
Figure 3:
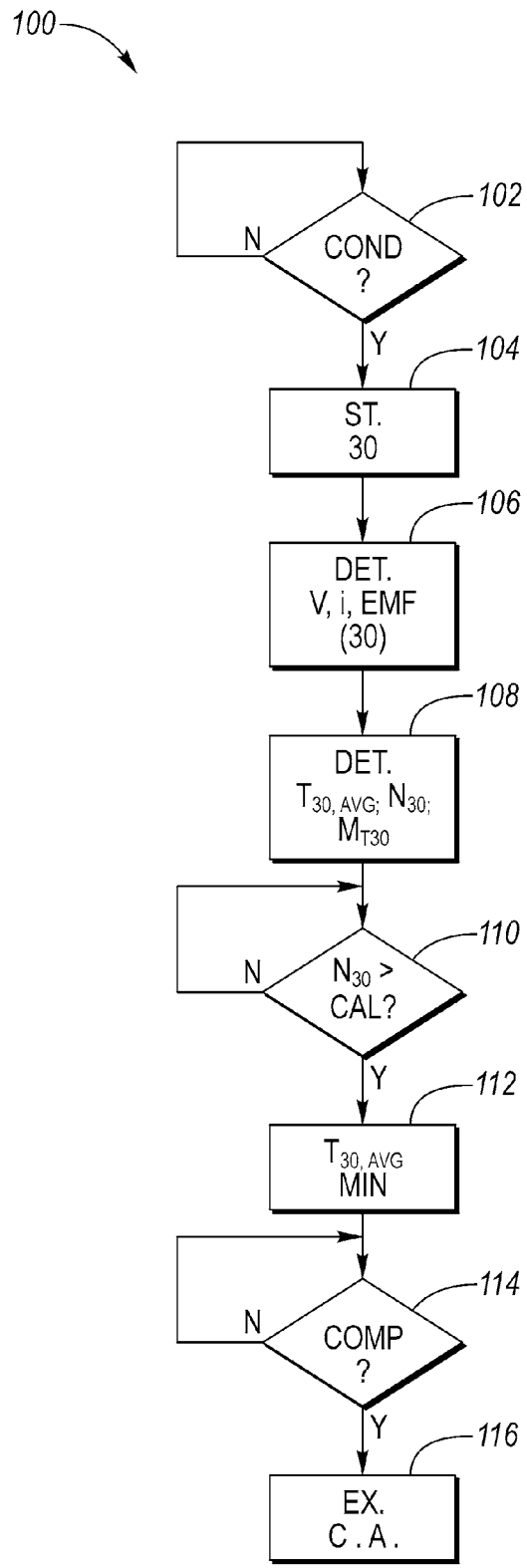
FIG. 3 is a flow chart describing an example method for detecting when the hydraulic system of the vehicle shown in FIG. 1 is charged.

Referring to FIG. 2, a set of vehicle parameters 40 illustrates the method 100 of FIG. 3. Time (t) is plotted on the horizontal axis, and amplitude (A) is plotted on the vertical axis. The vehicle parameters 40 include actual line pressure (trace $P_L$), a calculated average torque of the pump motor 30M ($T_{30, AVG}$) and a calculated slope of the average torque (trace $M_{T30}$), i.e., the rate of change in trace $T_{30, AVG}$. Clutch pressure (trace $P_C$) indicates the clutch pressure or capacity acting on an example clutch of the vehicle 10 used during an engine starting event, such as the input clutch CI of FIG. 1 or a clutch of the transmission 14. While only one clutch pressure (trace $P_C$) is shown in FIG. 2 for illustrative simplicity, more than one clutch is typically engaged to start the engine 12. Also shown in FIG. 2 is actual pump speed (trace $N_{30}$) of the pump motor 30M of FIG. 1, i.e., calculated or measured, and a line pressure flag ($F_L$) indicating that a desired calibrated line pressure ($P_L$, $D_{ES}$) has been achieved, i.e., that the hydraulic system is sufficiently charged to a level appropriate for a predetermined event, with the line pressure flag ($F_L$) triggering at point 42.

At a high level, the controller 20 looks for the actual pump speed (trace $N_{30}$) to exceed a commanded pump speed by a calibrated amount. Based on the fluid temperature ($T_S$) and the calculated average torque and slope values, the controller 20 detects a condition in which the hydraulic system 50 of FIG. 1 has reached a steady state torque value indicating attainment of a calibrated line pressure, i.e., that the hydraulic system 50 has been fully charged. The vehicle parameters 40 will now be described with reference to FIG. 3.

The method 100 of FIG. 3 begins at step 102, wherein the controller 20 of FIG. 1 determines whether conditions warrant continuing with further execution of the method 100. Step 102 may include detecting, via the controller 20, whether a predetermined event is requested requiring hydraulic pressure from the hydraulic system 50, such as starting of the engine 12. Step 102 can occur automatically by detecting a signal from a key fob or ignition switch, for instance, or by making the determination in logic of the controller 20. The method 100 may proceed to step 104 only when the conditions of step 102 are satisfied.

At step 104, the controller 20 starts the pump motor 30M, such as via transmission of the pump speed control signals (arrow $N_{CC}$) of FIG. 1 to the pump motor 30M. If the pump motor 30M is already running, the method 100 proceeds directly to step 106.

Step 106 entails determining the voltage (V), current (i), and back-EMF of the pump motor 30M. To accomplish step 106, the controller 20 receives the input signals (arrow $S_{11}$) from the pump motor sensors 11, which as noted above may include a voltage sensor and a current sensor. Back-EMF of the pump motor 30M may be calculated by the controller 20 from the measured voltage of two of the three phase voltages feeding pump motor 30M. Step 106 is conducted continuously, such as once per control loop, and temporarily recorded in memory (M) of the controller 20 for use in step 108. The method 100 then proceeds to step 108.

Step 108 entails determining the average pump torque, the actual pump speed, and slope of the average pump torque. These values are indicated in FIG. 2 as traces $T_{30, AVG}$, $N_{30}$, and $M_{T30}$, respectively. Actual pump speed (trace $N_{30}$) may be calculated from the input signals (arrow $S_{11}$) or measured using a speed sensor, in which case the speed sensor would be one of the sensors 11.

In a simplified embodiment, the controller 20 may store a lookup table of pump torque values in memory (M) indexed by current, voltage, back-EMF, and sump temperature ($T_S$), with step 108 including extracting the corresponding torque value for the measured voltage, current, and back-EMF. Alternatively, the controller 20 may calculate pump torque using known relationships, as is known in the art of "sensorless" motor control. Slope is the rate of change of the previously-calculated average pump torque, i.e., trace $T_{30, AVG}$. The method 100 proceeds to step 110 when the average pump torque ($T_{30, AVG}$), the actual pump speed ($N_{30}$), and the slope ($M_{T30}$) of the average pump torque have been calculated.

At step 110, the controller 20 of FIG. 1 next compares the actual pump speed (trace $N_{30}$) to a calibrated speed threshold. The controller 20 proceeds to step 112 only when the actual pump speed (trace $N_{30}$) rises above the calibrated speed threshold.

At step 112, when the actual pump speed (trace $N_{30}$) rises above the calibrated speed threshold as noted above with reference to step 110, the controller 20 calculates a minimum average pump torque, i.e., $T_{30, AVG\ MIN}$, and "latches" to this particular value, such as by storing only those values of the minimum average pump torque that are less than the latched value. In other words, the minimum of step 112 serves as a reference point for the remainder of method 100.

In FIG. 2, the average pump torque ($T_{30, AVG}$) rises just after $t_1$, and then decreases until just before about $t_2$, thereafter settling at a relatively even level until shortly before $t_3$. Latching thus occurs in FIG. 2 at the minimum level attained after $t_2$. In a possible embodiment, the average torque, slope, and pump speed are calculated as soon as the fluid pump 30 is commanded on. The latching logic only becomes active once the actual pump speed (trace $N_{30}$) has reached the calibrated speed threshold.

At step 114, the controller 20 monitors the changing slope of the average torque, i.e., the trajectory of trace $M_{T30}$, and the average pump torque (trace $T_{30, AVG}$), with the controller 20 looking for indications of steady state operation. This occurs in FIG. 2 at point 42 at about $t_4$, where the slope (trace $M_{T30}$) reaches zero and the average torque (trace $T_{30, AVG}$) plateaus and begins to decline. When this decline occurs at point 42, the controller 20 sets a flag ($F_L$) indicating that the desired calibrated line pressure has been attained, i.e., that the hydraulic system 50 of FIG. 1 is fully charged for the purposes of supplying fluid pressure for the predetermined event. The method 100 then proceeds to step 116.

Step 116 entails executing a control action with respect to the hydraulic system 50 and/or the transmission 14. An example control action may include commanding application of the input clutch CI and/or the hydraulically-actuated device 14D, e.g., one or more rotating clutches and/or braking clutches, and thereafter cranking and starting the engine 12. Short of this, a suitable control action may simply entail setting the flag ($F_L$) in memory (M) of the controller 20, or providing some other indicator to the controller 20 or other control systems of the vehicle 10 that the hydraulic system 50 is charged and ready for use.

Using the method 100 described above, the controller 20 of FIG. 1 is able to optimize start and drive away times in hybrid vehicles by eliminating the need for open-loop timers, which as known in the art must be calibrated to provide sufficient time for covering worst-case scenarios. The present approach also eliminates certain types of hardware sensors such as pressure switches and transducers, which are used in conventional vehicles to directly measure line pressure and compare it to a threshold. Removal of such hardware can help reduce cost and component count. As a result, the controller 20 may be able to protect clutch hardware during situations in which adequate clutch torque capacity is not attained, a condition that could result in clutch slip and thus excessive or premature wear.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a transmission having a hydraulically-actuated device;
an electrically-driven fluid pump having a pump motor, wherein the fluid pump is operable to circulate hydraulic fluid to the hydraulically-actuated device via a hydraulic circuit;
a set of pump motor sensors positioned with respect to the pump motor, wherein the set of pump motor sensors determines electrical properties of the pump motor and outputs the measured electrical properties as input signals; and
a controller having a processor and memory on which is recorded instructions for detecting when the hydraulic system is fully charged, wherein the controller is programmed to selectively execute the instructions from the memory to thereby:
determine an actual speed of the pump motor;
calculate an average pump torque and a slope of the average pump torque for the pump motor using the input signals;
determine when the actual speed of the pump motor exceeds a calibrated speed threshold; and
set a flag in memory of the controller when the actual speed of the pump motor exceeds the calibrated speed threshold and the slope of the average pump torque reaches zero, wherein setting the flag indicates that a calibrated hydraulic line pressure has been attained in the hydraulic circuit.

2. The vehicle of claim 1, wherein the vehicle includes a high-voltage polyphase AC bus supplying the pump motor with at least 18 VAC, and wherein the pump motor and the set of pump motor sensors are electrically connected to the high-voltage polyphase AC bus.

3. The vehicle of claim 2, wherein the electrical properties include a voltage, a current, and a back-electromotive force (back-EMF) of the pump motor.

4. The vehicle of claim 1, further comprising a temperature sensor positioned within a fluid sump of the transmission and configured to measure a sump temperature, wherein the controller is programmed to adjust a pump speed control signal to the pump motor using the measured sump temperature.

5. The vehicle of claim 1, wherein the set of pump motor sensors includes a speed sensor, and wherein the controller determines the actual speed of the pump motor by measuring the actual speed via the speed sensor.

6. The vehicle of claim 1, wherein the vehicle includes an internal combustion engine, and wherein the controller executes the instructions only when a requested starting of the internal combustion engine is detected.

7. A system comprising:
an electrically-driven fluid pump having a pump motor, wherein the fluid pump is operable for circulating fluid to a hydraulically-actuated device;
a set of pump motor sensors positioned with respect to the pump motor, wherein the set of pump motor sensors is configured to determine electrical properties of the pump motor and output the measured electrical properties as input signals; and
a controller having a processor and memory on which is recorded instructions for detecting when the hydraulic system is fully charged, wherein the controller is programmed to selectively execute the instructions from the memory to thereby:
determine an actual speed of the pump motor;
determine when the actual speed of the pump motor exceeds a threshold;
calculate an average pump torque and a slope of the average pump torque for the pump motor using the input signals; and
set a flag indicating that a calibrated line pressure has been attained in a hydraulic circuit feeding the hydraulically-actuated device when the actual speed of the pump motor exceeds the threshold and the slope of the average pump torque reaches zero.

8. The system of claim 7, further comprising a high-voltage polyphase AC bus supplying the pump motor with at least 18 VAC, wherein the pump motor and the set of pump motor sensors are electrically connected to the polyphase AC bus.

9. The system of claim 7, wherein the electrical properties include a voltage, a current, and a back-electromotive force (back-EMF) of the pump motor.

10. The system of claim 7, further comprising a temperature sensor configured to measure a temperature of the fluid, wherein the controller is programmed to adjust a pump speed control signal to the pump motor using the measured temperature of the fluid.

11. The system of claim 7, wherein the set of pump motor sensors includes a speed sensor, and wherein the controller is programmed to determine the actual speed of the pump motor by measuring the actual speed via the speed sensor.

12. The system of claim 7, wherein the controller executes the instructions only when a predetermined event is requested.

13. The system of claim 12, further comprising an internal combustion engine, wherein the predetermined event is a starting of the internal combustion engine requiring actuation of the hydraulically-actuated device.

14. A method for detecting when a hydraulic circuit providing hydraulic fluid pressure to a hydraulically-actuated device via an electrically-driven fluid pump is fully charged, the method comprising:
providing electrical power to a pump motor of the fluid pump;
determining electrical properties of the pump motor via a set of pump motor sensors;
outputting the measured electrical properties as input signals;

receiving the input signals via a controller having a processor and memory on which is recorded instructions; and executing the instructions via the controller to:
- determine an actual speed of the pump motor;
- calculate an average pump torque and a slope of the average pump torque for the pump motor using the input signals; and
- set a flag in memory of the controller when the slope of the average pump torque reaches zero and the actual speed of the pump motor exceeds a calibrated speed threshold, wherein the setting of the flag indicates that a calibrated line pressure has been reached in the hydraulic circuit.

15. The method of claim 14, wherein determining electrical properties of the pump motor includes measuring a voltage and a current, and calculating a back-electromotive force (back-EMF) of the pump motor.

16. The method of claim 14, further comprising:
measuring a sump temperature of a fluid sump of the transmission via a temperature sensor; and
adjusting a speed command to the pump motor via the controller using the measured sump temperature.

17. The method of claim 14, wherein the set of pump motor sensors includes a speed sensor, and wherein determining the actual speed of the pump motor includes measuring the actual speed via the speed sensor.

18. The method of claim 14, further comprising an internal combustion engine, the method further comprising executing the instructions only when a requested starting of the internal combustion engine is detected.

\* \* \* \* \*